United States Patent
Ueki

(10) Patent No.: US 10,113,087 B2
(45) Date of Patent: Oct. 30, 2018

(54) ADHESIVE SHEET

(71) Applicant: SOMAR CORPORATION, Chuo-ku, Tokyo (JP)

(72) Inventor: Ayumi Ueki, Tokyo (JP)

(73) Assignee: Somar Corporation, Tokyo (JP)

( * ) Notice: Subject to any disclaimer, the term of this patent is extended or adjusted under 35 U.S.C. 154(b) by 0 days.

(21) Appl. No.: 15/115,042

(22) PCT Filed: Jan. 29, 2015

(86) PCT No.: PCT/JP2015/052587
§ 371 (c)(1),
(2) Date: Jul. 28, 2016

(87) PCT Pub. No.: WO2015/115570
PCT Pub. Date: Aug. 6, 2015

(65) Prior Publication Data
US 2016/0340555 A1   Nov. 24, 2016

(30) Foreign Application Priority Data

Jan. 31, 2014   (JP) .................. 2014-018103
Jan. 31, 2014   (JP) .................. 2014-018104

(51) Int. Cl.

| | | |
|---|---|---|
| B32B 7/02 | (2006.01) | |
| C09J 7/02 | (2006.01) | |
| C08L 63/00 | (2006.01) | |
| C09D 129/14 | (2006.01) | |
| C09D 133/06 | (2006.01) | |
| C09D 167/00 | (2006.01) | |
| C09D 171/00 | (2006.01) | |
| C09J 163/00 | (2006.01) | |
| C09J 163/04 | (2006.01) | |
| C09D 163/00 | (2006.01) | |

(52) U.S. Cl.
CPC ............ *C09J 7/0203* (2013.01); *C08L 63/00* (2013.01); *C09D 129/14* (2013.01); *C09D 133/062* (2013.01); *C09D 163/00* (2013.01); *C09D 167/00* (2013.01); *C09D 171/00* (2013.01); *C09J 163/00* (2013.01); *C09J 163/04* (2013.01); *C09J 2201/36* (2013.01); *C09J 2203/318* (2013.01); *C09J 2203/326* (2013.01); *C09J 2205/11* (2013.01); *C09J 2205/114* (2013.01); *C09J 2429/00* (2013.01); *C09J 2463/00* (2013.01); *C09J 2467/00* (2013.01); *C09J 2471/00* (2013.01)

(58) Field of Classification Search
CPC .... C09J 5/06; C09J 5/08; C09J 163/00; C08L 63/00; C09D 163/00
See application file for complete search history.

(56) References Cited

U.S. PATENT DOCUMENTS

| | | | | |
|---|---|---|---|---|
| 6,540,865 B1 * | 4/2003 | Miekka | .................. | C09J 7/0203 156/184 |
| 8,105,460 B2 * | 1/2012 | Sheasley | ................ | B23K 11/34 156/307.1 |
| 2004/0076831 A1 * | 4/2004 | Hable | ...................... | B05D 7/02 428/413 |
| 2006/0263596 A1 * | 11/2006 | Bamborough | ...... | B29C 47/0021 428/354 |
| 2008/0308212 A1 * | 12/2008 | Sheasley | .............. | C08G 59/502 156/78 |
| 2010/0300613 A1 * | 12/2010 | Stogbauer | .............. | C09J 7/0203 156/256 |
| 2015/0284607 A1 * | 10/2015 | Imamura | ................ | B32B 37/12 428/212 |

FOREIGN PATENT DOCUMENTS

| | | |
|---|---|---|
| CN | 101772532 A | 7/2010 |
| JP | H05-186625 A | 7/1993 |
| JP | H09-176616 A | 7/1997 |
| JP | 2000-344928 A | 12/2000 |
| JP | 2002-283526 A | 10/2002 |
| JP | 2003-176466 A | 6/2003 |
| JP | 2010-529285 A | 8/2010 |
| JP | 2011-500902 A | 1/2011 |
| JP | 2011-144256 A | 7/2011 |
| WO | 2009/150818 A1 | 12/2009 |

OTHER PUBLICATIONS

Dow Chemical Company, DER 661 Datasheet, Dec. 2000.*
ISA/JP, International Search Report dated Jun. 9, 2015 in International Application No. PCT/JP2015/052587, total 5 pages with translation.
SIPO, The First Office Action dated Jun. 27, 2018 in CN Patent Application No. 201580006357.3, total 15 pages with the English translation.

* cited by examiner

*Primary Examiner* — Maria V Ewald
*Assistant Examiner* — Zachary M Davis
(74) *Attorney, Agent, or Firm* — Masuvalley & Partners

(57) ABSTRACT

The present device is an adhesive sheet having an adhesive layer consisting of an adhesive composition containing a thermosetting resin and a thermal foaming agent and a coating layer. The coating layer having a resin and provided on the adhesive layer. The coating layer is characterized in that it does not exhibit tackiness at room temperature. In addition, at least a part of the coating layer disappears in a region ranging from an interface between the adhesive layer and the coating layer to a surface of the coating layer by heating the adhesive sheet at a temperature not lower than a curing starting temperature of the adhesive layer and wherein the following inequation is satisfied: $T3<T1$, $T1$ is a thermal foaming temperature of the thermal foaming agent, and $T3$ is a glass transition temperature of the coating layer.

15 Claims, No Drawings

ADHESIVE SHEET

RELATED APPLICATIONS

The present invention is the U.S. National Phase of and claims priority to International Patent Application No. PCT/JP2015/052587 filed Jan. 29, 2015 entitled ADHESIVE SHEET, which claims priority to Japanese Patent Application No. JP 2014-018103 filed Jan. 31, 2014 and Japanese Patent Application No. JP 2014-018104 filed Jan. 31, 2014; all of which are incorporated herein by reference in their entireties.

TECHNICAL FIELD

The present invention pertains to an adhesive sheet, more particularly an adhesive sheet suitable for the use in, for example, void filling applications.

BACKGROUND ART

Adhesive sheets comprising an adhesive layer consisting of a foamable thermosetting adhesive composition for which the volume expands by heating at or above a prescribed temperature and the adhesive force increases as the curing reaction progresses are favorably used, for example, in void filling applications. As for this type of adhesive sheet, a thermally foamable sheet composition consisting of a foamable thermosetting resin composition essentially comprising a resin component containing an epoxy resin that is in a liquid or semi-solid state at room temperature and a thermal foaming agent containing an amine carbonate salt, is known (Patent Document 1).

PRIOR ART DOCUMENT

Patent Document

Patent Document 1: JP H05-186625 A

SUMMARY OF THE INVENTION

Problem to be Solved by the Invention

Patent Document 1 describes a sheet composition that exhibits a good balance between foaming and curing, thus foamed and cured satisfactory by heating in a short period of time. However, the resin component of Patent Document 1 contains a large amount of an epoxy resin (60% of the total resin components or more in the examples) that is in a liquid or semi-solid state at room temperature, and the sheet composition thus obtained exhibits tackiness at room temperature. Thus, if the sheet composition is inserted into a narrow void, the sheet composition is affixed to a different location than where adhesion should occur, thereby decreasing workability. Further, when the sheets are stacked during transportation, storage or the like, they tend to stick together and a blocking may occur, which hampers the use of these sheets, and thus, in practical use, a separator film or the like must be used to prevent adherence of the sheet to other layers. An introduction of separator film has prevented the blocking during shipment or storage, but the separator film should be peeled off before being applied, and an effective means for preventing an occurrence of irregular affixing upon the insertion into a narrow space or the like had not been discovered.

In light of the above-described problems, it is therefore an object of the present invention to provide an adhesive sheet which can prevent a decrease in workability caused by, for example, tackiness. In particular, given that the problems attributed to the tackiness often occur with adhesive compositions having excellent foaming properties, another object of the present invention is to provide an adhesive sheet which exhibits excellent workability while maintaining sufficient foaming ability.

Means to Solve the Problem

With the aim to prevent the resin component of the adhesive layer from becoming tacky at room temperature, the present inventors found out that the undesirable affixing and the occurrence of blocking phenomenon during the handling can be prevented by laminating a coating layer which consists of a resin and does not exhibit tackiness at room temperature but softens and disappears upon heating, and thereby accomplished the present invention.

Namely, the adhesive sheet of the present invention is an adhesive sheet comprising: an adhesive layer consisting of an adhesive composition containing a thermosetting resin; and a coating layer containing a resin and formed on the adhesive layer, wherein the coating layer does not exhibit tackiness at room temperature and at least a part of the coating layer disappears in the region ranging from an interface between the adhesive layer and the coating layer to a surface of the coating layer by heating the adhesive sheet at a temperature not lower than the curing starting temperature of the adhesive layer.

It is preferable that the adhesive composition contains a thermal foaming agent and a thermosetting resin having a softening temperature of not higher than 105° C.

In one embodiments of the invention, the adhesive sheet is preferably satisfies an equation $T3<T1 \leq T2$
where T1 is a thermal foaming temperature of the thermal foaming agent, T2 is a curing starting temperature of the adhesive layer, and T3 is a glass transition temperature of the coating layer.

In one preferred embodiment of the adhesive sheet of the invention, T1 is 100° C. or higher to 200° C. or lower, T2 is 110° C. or higher to 250° C. or lower, and T3 is 60° C. or higher to 140° C. of lower.

In one preferred embodiment of the adhesive sheet of the invention, the adhesive sheet is preferably satisfies an equation $t2 \leq 0.6 \times t1$
where t1 is a thickness of the adhesive layer prior to heating, and t2 is a thickness of the coating layer. At this time, it is preferable that t2 is 0.5 μm or more to 600 μm or less, and t1 is 20 μm or more to 1000 μm or less.

Further, in one embodiment of the adhesive sheet of the invention, it is preferable that the thermosetting resin contained in the adhesive composition has a weight average molecular weight of 450 or more to 1650 or less. Preferably the thermosetting resin is an epoxy resin.

In a further embodiment, the thermal foaming agent is preferably thermally expandable microspheres.

In another embodiment of the adhesive sheet of the invention, it is preferable that the thermal foaming agent is contained in an amount of 1 part to 30 parts by mass relative to 100 parts by mass of the thermosetting resin contained in the adhesive composition.

The embodiment of the adhesive sheet of the present invention does not exclude an aspect wherein the adhesive sheet consists of only the adhesive layer and the coating layer, but the adhesive sheet of the invention may be configured by including a substrate on which the adhesive layer is formed.

The adhesive sheet of the present invention can be used to fill a void.

Further, an image display device, portable electronic device, or automobile component according to the present invention is characterized by a use of the adhesive sheet according to any of the described embodiments of the present invention.

Effects of the Invention

The adhesive sheet of the present invention can prevent a decrease in workability due to tackiness or the like. In particular, the adhesive sheet of the present invention is advantageous when an adhesive composition having an excellent foaming property is used, providing excellent workability while maintaining sufficient foaming ability.

The adhesive sheet of the present invention can be applied to the uses, including but not limited to, void filling application. When used in a void filling application, the void size is not particularly limited, for example, the adhesive sheet of the present invention can be used in an application to fill a small void of 1 mm or less (for example, of the order of tens of μm to several hundreds of μm).

The term "small void" as used herein encompasses any voids such as a space formed between a housing (window part) and an image display member fixed to an image display device (liquid crystal display, electroluminescent display, plasma display, and the like) or an optical member (camera, lens, and the like) fixed to a portable electronic device (cell phone, portable information terminal, and the like), a gap between adjacent coils of different phases in a coil end part of a stator used in a motor or generator, particularly a gap between a coil and an insulation sheet which is interposed in the gap, a gap within a slot groove of a stator core, and the like.

EMBODIMENT FOR CARRYING OUT THE INVENTION

The adhesive sheet according to an embodiment of the present invention is configured by arranging a coating layer on an adhesive layer. In this embodiment, the coating layer is characterized that it does not exhibit tackiness at room temperature and at least a part of the coating layer disappears in the region ranging from an interface between the adhesive layer and the coating layer to a surface of the coating layer by heating the adhesive sheet at a temperature not lower than the curing starting temperature of the adhesive layer. By adopting a such configuration, the adhesive sheet of the invention can prevent a decrease in workability caused by, for example, tackiness, while maintaining adhesiveness.

The present inventors identified that, in conventional configurations, increasing a weight average molecular weight of a thermosetting resin contained in an adhesive layer so that the resin component of the adhesive layer does not produce tackiness at room temperature and beyond a certain value (800): (1) decreases tackiness the adhesive layer exhibited at room temperature and suppresses a decrease in workability, but when the adhesive sheet is bent, the adhesive layer causes cracks and comes off and thus the reuse of the once bent adhesive sheet is not possible; (2) decreases the reactivity with a curing agent that is blended when necessary, which requires the curing temperature to be increased, resulting the lack of economic efficiency.

According to the present invention, a decrease in workability due to tackiness can be suppressed by adopting the above-mentioned coating layer. Furthermore, the present invention can prevent cracking caused by increasing the weight average molecular weight of the thermosetting resin, and suppress an increase in cost due to the curing temperature rise, and thus can resolve the problems that has arisen from the conventional configuration.

As used herein the term "exhibiting tackiness at room temperature" refers to being confirmed the adherence with the following method.

A sheet produced by laminating an adhesive layer and a coating layer on a substrate is cut into pieces measuring 5 cm×5 cm to prepare six adhesive sheets. The six adhesive sheets are stacked so that the coating layers of the adhesive sheet are opposed to each other, and then sandwiched between glass plates. A load of 100 g is applied onto the laminated body and then left for 24 hours at room temperature (25° C.), after which the load is removed and the distance between glass plates are increased in vertical direction, the state in which there existed delamination between an adhesive layer and a substrate of the adhesive sheet while the coating layers of respective adhesive sheets are adhered each other is referred to being closely adhered, in other words, that the coating layer exhibits tackiness at room temperature. In contrast, when the distance between glass plates are increased in vertical direction and there observed the peeling between coating layers in contact with each other, it is referred that the coating layer does not exhibit tackiness at room temperature.

As used herein the term "occurrence of cracks" refers to a state in which a crack occurs in the adhesive layer and at least a part of the adhesive layer either comes off or is in a state of possibly coming off, when the adhesive sheet is bent 180 degrees.

By heating the adhesive sheet of the present invention at a temperature not lower than the curing starting temperature of the adhesive layer, at least a part of the coating layer disappears in the region ranging from an interface between the adhesive layer and the coating layer to a surface of the coating layer. As used herein the term "the coating layer disappears" generally means that applying heat exceeding the glass transition temperature of the coating layer forming resin to the adhesive sheet of the present invention softens the coating layer, resulting that the resin of the coating layer mixes with the thermosetting resin (prior to curing) that forms the adhesive layer, so that integrated with the adhesive layer, thus the coating layer that was present on the adhesive layer apparently disappears. Particularly, it is determined that the coating layer has disappeared when the adhesive sheet is cut by the method described in the following and the cross-section of the adhesive sheet is observed through the microscope, and then it is found that at least a part of the coating layer disappears in the region ranging from an interface between the adhesive layer and the coating layer to a surface of the coating layer. Namely, in the present invention, a state in which at least a part of the adhesive layer after heat curing is exposed to the part in contact with an adherend of the adhesive sheet whose adhesive layer was cured by heating, will be also determined as "the coating layer has disappeared." In other words, when interpreting the meaning of the "coating layer disappears" in the scope of the present invention, the extent of mixing of the resin that forms the coating layer with the thermosetting resin (prior to curing) that forms the adhesive layer is not necessarily full degree, and only a function as an adhesive layer needs to be exhibited on a sheet surface after heat curing. At least a part of the adhesive layer after heat curing may be exposed to a part of the adhesive sheet with the adhesive layer cured by heating, which is in contact with an adherend. When the entire part of the adhesive layer after heat curing is exposed to the sheet surface, it means the coating layer on the adhesive layer is completely disappeared.

Note that here, the curing starting temperature of the adhesive layer is calculated using a method described in the following, and thereby it may be determined whether or not the adhesive layer has disappeared by observing a state of the adhesive sheet after heating at a temperature 100° C. to 250° C. higher than the above-mentioned temperature for 5 to 60 minutes. Generally, it may be determined from a state of the adhesive sheet after heating at 160 to 220° C. for 20 to 30 minutes.

In one embodiment of the invention, the adhesive composition may preferably contain a thermal foaming agent. Thereby the adhesive layer increases in volume when heated at a temperature higher than a predetermined temperature, and thus increases adhesive strength as the curing reaction progresses further, therefore the adhesive sheet may be preferably used in applications for filling voids. When the thermal foaming agent is contained, the adhesive composition preferably contains a thermosetting resin having a softening temperature of 105° C. or less in order to obtain excellent foaming characteristics.

It has been a problem in the conventional configuration that the adhesive layer exhibits tackiness at room temperature for obtaining excellent foaming characteristics. When the weight average molecular weight of the thermosetting resin contained in the adhesive layer increases and exceeds a certain value of weight average molecular weight (800), in order to prevent the resin component of the adhesive layer from producing tackiness at room temperature: (1) the tackiness the adhesive layer exhibited at room temperature decreases and a decrease in workability is suppressed, but when the adhesive sheet is bent, the adhesive layer causes cracks and comes off and thus the reuse of the once bent adhesive layer is not possible; or (2) the reactivity with the curing layer decreases, which requires the curing temperature to be increased, resulting the lack of economical efficiency. Further, once the weight average molecular weight exceeds a certain value (1650), (3) the resin becomes difficult to be softened as the softening temperature increases, thereby the thermal foaming agent won't foam well upon heating. Furthermore, once the weight average molecular weight exceeds a certain value (3000), (4) although the generation of cracks is suppressed due to an increased film formability, the resin becomes difficult to be softened as the softening temperature increases, thereby the thermal foaming agent won't foam well upon heating.

In contrast, by adopting the coating layer of the present invention, excellent workability can be achieved while maintaining sufficient foaming performance.

Furthermore, in one preferred embodiment of the invention, the adhesive sheet is preferably satisfies the equation
T3<T1≤T2
where T1 is a thermal foaming temperature of the thermal foaming agent, T2 is a curing starting temperature of the adhesive layer, and T3 is a glass transition temperature of the coating layer. The details are described in the following.

[Adhesive Layer]

Examples of the thermosetting resins contained in the adhesive layer forming adhesive composition as an essential components include among others epoxy resin, phenoxy resin, silicone resin, oxetane resin, phenol resin, (meth) acrylate resin, polyester resin (unsaturated polyester resin), diallyl phthalate resin, maleimide resin, polyimide resin, polyamic acid resin, polyether imide resin, polyester imide resin, polyamide-imide resin, bismaleimide-triazine resin. Specific examples preferably include among others epoxy resin, (meth)acrylate resin, phenoxy resin, polyester resin, polyimide resin, polyamic acid resin, polyether imide resin, polyester imide resin, polyamide-imide resin, silicone resin, maleimide resin, bismaleimide-triazine resin, and these resins may be used alone or in a combination thereof. Of these, epoxy resin is preferred because of its excellent curing performance, storage performance, heat resistance of the cured article, moisture resistance, and chemical resistance.

Examples of epoxy resins include bisphenol A epoxy resin, bisphenol F epoxy resin, bisphenol S epoxy resin, hydantoin epoxy resin, bisphenyl epoxy resin, alicyclic epoxy resin, triphenyl methane epoxy resin, phenol novolac epoxy resin, cresol novolac epoxy resin, naphthol novolac epoxy resin, dicyclopentadiene/phenol epoxy resin, alicyclic amine epoxy resin, aliphatic amine epoxy resin and modified epoxy resins thereof such as CTBN modification, halogenattion, and of these resins, especially bisphenol A epoxy resin and novolac epoxy resin are preferred. These resins may be used alone or in a combination thereof.

Generally, the epoxy resin preferably has a viscosity at 190° C. of 0.05 Pa·s or greater, and more preferably 0.1 Pa·s or greater. It is typically preferred that the viscosity is not more than 3.0 Pa·s, and more preferably not more than 1.8 Pa·s. If the viscosity is too low, the foaming state of the thermal foaming agent would not be maintained, and there is a concern of formation of open-cell foam or foam breakage. If the viscosity is too high, as the external foaming pressure becomes higher than the internal foaming pressure, there is a concern that the thermal foaming agent will not foam. The viscosity described herein is a value measured using a dynamic viscoelasticity measuring device (Bohlin C-VOR from Malvern Instruments).

An epoxy equivalent weight [weight per epoxy] (WPE) of the epoxy resin is typically at least 150, preferably at least 180, and typically not more than 1000, preferably not more than 700. If the WPE is too low, a cured article having many crosslinking points and high heat resistant may be obtained, but its toughness may be decreased and thus the cured article may become brittle. If the WPE is too high, there only exit a few crosslinking points, thus heat resistance may decrease and a reactivity of the curing reaction may be reduced, therefore, maintenance of the foaming state may become difficult and foam breakage or open-cell foam formation could proceed. The term "epoxy equivalent weight" herein is defined as the molecular weight of epoxy resin per epoxy group. Here, the term "epoxy group" is a group containing 3-membered ring ether, oxacyclopropane (oxirane ring), and in addition to an epoxy group in the narrow sense, it includes a glycidyl group (including glycidyl ether and glycidyl ester groups). The WPE is determined, for example, through a method described in JIS K 7236, determining the epoxy weight equivalent of epoxy resin (2001), (perchloric acid-tetraethylammonium bromide method).

The epoxy resin is a semi-solid or solid at room temperature, and when resin is a solid, its softening temperature is preferably at most 105° C., more preferably at most 95° C. Also, generally it is preferable that its softening temperature is at least 40° C., more preferably at least 45° C. If the epoxy resin is liquid at room temperature, the decrease in viscosity upon curing and foaming may be significant, and thus the foaming state of the epoxy resin would not be maintained, and therefore there is a possibility that foam breakage and open-cell foam formation proceeds further. Further, there is a concern that the shape of the adhesive layer would not be kept.

By configuring the adhesive layer to include a thermosetting resin (preferably an epoxy resin) having a softening temperature of not more than 105° C., the resin can be softened by heating, resulting that the thermal foaming agent foams excellently in the adhesive layer. When the softening temperature is 105° C. or less, but less than 60° C., cracking may occur in the adhesive layer. However, in an embodiment of the invention, the adhesive layer is covered with a coating layer, so that the adhesive layer hardly comes off even if cracks occur in the adhesive layer, therefore it won't cause hindrance in usage.

By configuring the adhesive layer to include a thermosetting resin (preferably an epoxy resin) having a softening temperature of not more than 60° C., in addition to the above-mentioned advantage (the thermal foaming agent in the adhesive layer can foam excellently upon heating), cracking won't occur in the adhesive layer, and it contributes to preventing the adhesive layer from coming off. Note that when the adhesive layer is configured to include a thermosetting resin having a softening temperature of more than 130° C., the film formation capability increases, and thus cracking does not occur, but even heating may not soften the resin easily, and the thermal foaming agent might not foam sufficiently.

The softening temperature described herein is a value measured through the method stipulated by JIS K 7234 (ring and ball method).

In one embodiment of the invention, the weight average molecular weight of the thermosetting resin to be used is preferably 1650 or less, more preferably 800 or less.

By configuring the adhesive layer to include a thermosetting resin having a weight average molecular weight of 1650 or less, the resin can be adjusted to being more softened by heating, resulting that the thermal foaming agent foams more excellently in the adhesive layer. Further, by configuring the adhesive layer to include a thermosetting resin having a weight average molecular weight of 800 or less, in addition to the above-mentioned advantage (the thermal foaming agent in the adhesive layer can foam excellently upon heating), the occurrence of cracking will be prevented more in the adhesive layer.

Note that when the adhesive layer is configured to include a thermosetting resin having a weight average molecular weight of more than 3000, the film formation capability increases, and thus cracking may not easily occur, but even heating may not soften the resin easily, and the thermal foaming agent might not foam sufficiently.

In one embodiment of the invention, the thermosetting resin contained in the adhesive composition preferably has a weight average molecular weight of 450 or greater so that it may be easily formed into a sheet shape. When the molecular weight is less than 450, the resin will be in a state close to liquid at room temperature, and thus in some cases, that shape of the adhesive layer would not be kept.

Any of thermal foaming agents can be used, without limitation, as the thermal foaming agent contained in the adhesive layer forming adhesive composition, and, for example, any of the well-known thermal foaming agents (such as thermally decomposable foaming agent, expanded graphite, microcapsulated foaming agent) can be selected to be used accordingly, of these, a microcapsulated thermal foaming agent (hereinafter, referred to "thermally expandable microspheres") may be preferably used.

Preferred examples of thermally expandable microspheres include microspheres having a structure in which a foaming agent is encapsulated into the outer core having elasticity and exhibiting a thermal expandability (a characteristic of being expandable as a whole upon heating) as a whole.

Preferred examples of the outer core having elasticity include, for example, a thermally fusable substance, a substance that fractures through thermal expansion, including substances formed by such as a vinylidene chloride-acrylonitrile copolymer, polyvinyl alcohol, polyvinyl butyral, polymethyl methacrylate, polyacrylonitrile, polyvinylidene chloride, polysulfone.

Examples of the foaming agent include mainly but not limited to, a substance that easily gasifies and expands when heated, such as hydrocarbons including isobutene, propane, pentane. Examples of the commercially available thermally expandable microsphere products include, for example, a series of products named "Matsumoto Microspheres" (from Matsumoto Yushi-Seiyaku Co., Ltd.), the ADVANCELL EM series (from Sekisui Chemical Co., Ltd.), Expancel® (from Japan Fillite Co., Ltd.).

The size of the thermally expandable microspheres may be appropriately selected in accordance with the application of the adhesive sheet, and more specifically it is preferable that the mass average particle diameter is about 10 to 20 μm. The thermally expandable microspheres may be used after the particle size distribution is adjusted. Adjustment of the particle size distribution may be achieved by using, for example, a centrifugal force based wind power classifier, dry classifier, sieving apparatus to classify and remove the microspheres having a relatively large particle diameter contained in the thermally expandable microspheres to be used. In particular, it is preferable to adjust it such that the standard deviation of the particle size distribution of the thermally expandable microspheres will be 5.0 μm or less.

The expansion ratio of the thermally expandable microspheres is preferably 5 times or greater, and more preferably 7 times and greater. At the same time, the expansion ratio is preferably not more than 15 times, and more preferably not more than 12 times. Preferably, when the expansion ratio of the thermally expandable microspheres is 5 to 15 times, a control of the expansion ratio may become easy. Note that It is preferable that the outer core of the thermally expandable microspheres has appropriate strength, so that it does not rupture even if the thermally expandable microspheres are expanded up to the above-mentioned predetermined expansion ratio.

The blending amount of the thermally expandable microspheres per 100 parts by mass of the thermosetting resin is preferably at least 1 parts by mass, and more preferably at least 3 parts by mass, and is preferably not more than 30 parts by mass, more preferably not more than 20 parts by mass, and even more preferably not more than 15 parts by mass. If the blending amount of the thermally expandable microspheres is too small, the foaming rate of the adhesive layer as a whole may decrease, and there is a possibility that the adhesive layer will not expand necessarily and sufficiently. In contrast, if the blending amount is too high, excessive foaming may occur and thus there is a possibility that sufficient strength may not be maintained for an adhesive.

The thermal foaming agent preferably has a thermal foaming temperature (T1) of at least 100° C., more preferably at least 150° C., and at most 200° C., more preferably at most 190° C. When thermally expandable microspheres are used as a thermal foaming agent, T1 corresponds to the thermal expansion temperature, while when a thermally decomposable foaming agent is used, T1 corresponds to the thermal decomposition temperature. The term "thermal expansion temperature" herein has the same meaning as the foaming starting temperature, and in one embodiment of the invention, the thermal expansion temperature refers to a thermal expansion starting temperature measured by a thermal expansion measuring apparatus (TMA), and does not mean the maximum thermal expansion temperature at which the volume expands to the maximum limit.

Further, examples of other thermal foaming agents include, for example, thermally decomposable foaming agents, expanded graphite. Thermally decomposable foaming agents comprises inorganic and organic agents.

Examples of inorganic foaming agents include, for example, ammonium carbonate, ammonium bicarbonate, sodium bicarbonate, ammonium nitrite, sodium borohydride, azides. Examples of organic foaming agents include, for example, water, alkane chlorofluorides (such as trichloromonofluoromethane, dichloromonofluoromethane), azo compounds (such as azobisisobutyronitrile, azodicarbonamide (ADCA), barium azodicarboxylate), hydrazine compounds (such as para-toluenesulfonyl hydrazide, diphenyl sulfone-3,3'-disulfonyl hydrazide, 4,4'-oxybis(benzenesulfonyl hydrazide), allylbis(sulfonyl hydrazide)), semicarbazide based compounds (such as p-toluylenesulfonyl semicarbazide, 4,4'-oxybis(benzenesulfonyl semicarbazide)), triazole based compounds (such as 5-morpholyl-1,2,3,4-thiatriazole), N-nitroso based compounds (such as N,N'-dinitroso pentamethylene tetramine, N,N'-dimethyl-N,N'-dinitroso terephthalamide,).

These thermal foaming agent may be used alone or in a combination thereof.

The blending amount of these thermally decomposable foaming agents per 100 parts by mass of the thermosetting resin is preferably at least 5 parts by mass, and more preferably at least 10 parts by mass, and is preferably not more than 30 parts by mass, and more preferably not more than 25 parts by mass. If the blending amount of the thermally decomposable foaming agent is too small, the foaming rate of the adhesive layer as a whole may decreases, and there is a possibility that the adhesive layer will not sufficiently expand necessarily and sufficiently. In contrast, if the blending amount is too high, excessive foaming may occur and thus there is a possibility that sufficient strength may not be maintained for an adhesive.

The adhesive layer forming adhesive composition may contain optional components such as a curing agent, in addition to the above-described thermosetting resin and thermally expandable microspheres. Examples of curing agents include, for example, amide based curing agents, such as dicyandiamide (DICY), aliphatic polyamide; amine based curing agents, such as diamino diphenylmethane, meta-phenylenediamine, ammonia, triethyl amine, diethyl amine; phenol based curing agents, such as bisphenol A, bisphenol F, phenol novolac resin, cresol novolac resin, p-xylene novolac resin; acid anhydride based curing agents, such as methylnadic acid anhydride.

These curing agents may be used alone or in a combination thereof.

The blending amount of the curing agent may be calculated from the equivalence ratio of the curing agent to the thermosetting resin to be used, and the equivalence ratio is preferably in a range of 0.8 to 3.0. For example, when the curing agent is dicyandiamide, the lowest amount thereof relative to 100 parts by mass of the thermosetting resin is preferably at least 3 parts by mass, and more preferably at least 5 parts by mass, and the highest amount is preferably at most 30 parts by mass, and more preferably at most 15 parts by mass. When the curing agent is, for example, methyl nadic anhydride, the lowest amount thereof relative to 100 parts by mass of the thermosetting resin is preferably at least 60 parts by mass, and more preferably at least 80 parts by mass, and the highest amount is preferably at most 240 parts by mass, and more preferably at most 200 parts by mass. If the blending amount of the curing agent is less than the lowest described above, it may become difficult to obtain sufficient curing, so that there is a possibility that the characteristics of the thermosetting resin such as heat resistance, chemical resistance may not be sufficiently exhibited. While the blending amount thereof is more than the highest described above, it may cause an excessive exothermic reaction during the curing, and the viscosity of the resin composition during the curing reaction may decrease more than necessary, resulting in the possibility that maintaining sufficient foaming conditions becomes difficult.

Optionally a curing accelerator may be used with the curing agent. Examples of curing accelerators include, for example imidazoles such as 2-methylimidazole, 2-methyl-4-ethylimidazole, 2-phenylimidazole; tertiary amines such as 1,8-diazabicyclo[5.4.0]undecene-7, triethylene diamine, benzyldimethyl amine; organic phosphines such as tributylphosphine, triphenylphosphine. These can be used alone or in a combination thereof. The blending amount of the curing accelerator relative to 100 parts by mass of the thermosetting resin is preferably, for example, 5 parts by mass or less. When the amount is more than 5 parts by mass, the storage stability may possibly decrease.

Other additives that may be blended as optional components into the adhesive composition are elastomer components, including, for example, solid or liquid rubbers such as natural rubber, isoprene rubber, styrene-butadiene rubber, chloroprene rubber, butadiene rubber, nitrile rubber, butyl rubber, fluororubber, acrylic rubber, and polyurethane, urethane prepolymer. The blending amount thereof relative to 100 parts by mass of the thermosetting resin is preferably at most 20 parts by mass, more preferably at most 10 parts by mass, and even more preferably at most 5 parts by mass. Furthermore, foaming aids, various fillers, foam stabilizers, antioxidants, ultraviolet absorbing agents, coloring agents may be blended.

The adhesive composition of the embodiment of the invention may be obtained by adding a thermal foaming agent, curing agent, curing accelerator, foaming aid, other additives to the above-described thermosetting resin in arbitrary order when needed. Mixing of the above-described materials can be performed using a mixer such as mixing roll, planetary mixer, butterfly mixer, kneader, single-screw or twin-screw extruder, or a kneading machine. The mixing temperature may differ by compositions, but it is preferable that mixing is carried out at a temperature not higher than the thermal foaming temperature (T1) of the thermal foaming agent.

It is preferable that each component in the adhesive composition of the embodiment of the invention is blended such that the curing starting temperature (T2) of the adhesive layer, which is in a sheet state formed from the composition is preferably in a range of 110° C. to 250° C.

The adhesive layer may be obtained by coating the above-mentioned adhesive composition onto one or both surfaces of a substrate, described in the following, and then drying when needed. Note that the adhesive layer may also be obtained by coating the above-mentioned adhesive composition onto a coating layer, which is described further in the following, formed on an independently prepared release film, and then drying when needed.

The thickness of the adhesive layer prior to foaming (t1) may be selected accordingly depending on an application of the adhesive sheet, and the lowest value for thickness is preferably at least 20 μm, and more preferably at least 30 μm, and the highest value is preferably not more than 1000 μm, more preferably not more than 400 μm, and even more preferably not more than 200 μm. With the the adhesive layer thickness of at least 20 μm, air bubbles produced by the foaming reaction may be easily held within the adhesive layer. Further, the adhesive layer thickness (t1) of not more than 1000 μm may make possible to fill a narrow void, such as a void of 1 mm or below.

The substrate is not particularly limited and may be appropriately selected, and examples include, for example, synthetic resin films such as polyethylene terephthalate, polyimide and sheets such as aramid fiber. The substrate may be selected in accordance with the application of the adhesive sheet. Particularly for applications which require insulation and heat resistance, a use of, for example, polyimide film or aramid fiber sheet is preferred.

A thickness of the substrate may be appropriately selected according to the application. If the application is for use in, for example, an insulation sheet, which is described further in the following, the thickness of the substrate is preferably from 25 to 250 μm.

[Coating Layer]

As coating layer forming resins, the following thermoplastic resins, for example, can be used: phenoxy resin, polyester resin, polyurethane resin, polyimide resin, siloxane-modified polyimide resin, polybutadiene, polypropylene, styrene-butadiene-styrene copolymer, styrene-ethylene-butylene-styrene copolymer, polyacetal resin, polyvinyl butyral resin, polyvinyl acetal resin, butyl rubber, chloroprene rubber, polyamide resin, acrylonitrile-butadiene copolymer, acrylonitrile-butadiene-acrylic acid copolymer, acrylonitrile-butadiene-styrene copolymer, polyvinyl acetate, nylon. These can be used alone, or in a combination thereof. Of these, the use of, for example, phenoxy resin, polyester resin is preferred.

Examples of polyester resins include, for example, a product named Vylon® 200 (from Toyobo Co., Ltd.), a product named POLYESTER TP220 (from Nippon Synthetic Chemical Industry Co., Ltd.), a product named Elitel KA Series (from Unitika Ltd.).

A phenoxy resin refers herein to a high molecular weight thermoplastic polyether resin (*bisphenol type epoxy resin) produced from diphenol such as bisphenol A, bisphenol F and epihalohydrin such as epichlorohydrin. It is preferred that the weight average molecular weight of the phenoxy resin is 20,000 to 100,000. If the weight average molecular weight is too low, cracking would easily occur, while the weight average molecular weight is too high, the viscosity during the formation of coating film would become too high, making it difficult to obtain a smooth, uniform coating film.

The phenoxy resin refers herein to, for example, but not limited to, resins that have one or more structures selected from a bisphenol A backbone, bisphenol F backbone, bisphenol S backbone, bisphenol acetophenone backbone, novolac backbone, biphenyl backbone, fluorene backbone, dicyclopentadiene backbone, norbornene backbone, naphthalene backbone, anthracene backbone, adamantane backbone, terpene backbone, and a trimethyl cyclohexane backbone.

Examples of commercially available products of phenoxy resins include, for example, a product named PKHB, PKHC, PKHH, PKHJ (each from InChem Corp.), jER 1256, jER 4250, jER 4275 (each from Mitsubishi Chemical Corp.), YP-50, YP-50S, YP-70, ZX-1356-2, FX-316 (each from Nippon Steel & Sumikin Chemical Co., Ltd.).

Further, phenoxy resins dissolved in solvent are also commercially available, and these are similarly usable. Examples include, for example, jER 1256B40, jER 1255HX30, jER YX6954BH30, YX8100BH30, jER YL7174BH40 (each from Mitsubishi Chemical Corp.), YP-40ASM40, YP-50EK35, YPB-40PXM40, ERF-001M30, YPS-007A30, FX-293AT40 (each from Nippon Steel & Sumikin Chemical Co., Ltd.).

These phenoxy resins may be used alone, or in a combination thereof.

In one embodiment of the invention, optionally a curing agent such as isocyanate and organic peroxide may be further blended with the above-described thermoplastic resin when needed. Selecting the types and/or molecular weight, for example, of curing agents to blend will make it easy to finely adjust an affinity for the adhesive layer. The blending amount of the curing agent (such as isocyanate) to be blended may be approximately 3 to 30 parts by mass per 100 parts by mass of resin such as polyester resin, phenoxy resin.

The coating layer can be obtained by preparing a coating solution for coating layer formation, which is prepared by dissolving or dispersing the above-mentioned resin (in case a curing agent is blended therein, a resin contained a curing agent) in solvent, applying the coating solution onto the adhesive layer, and then drying. Note that the coating layer may be obtained by applying the above-mentioned coating solution for coating layer formation onto a separately prepared release film, and then drying.

The coating layer thickness (t2) is preferably not more than 60% of the thickness of the adhesive layer prior to heating (or prior to heating and foaming) (M. By adjusting the thickness t2 to be not more than 60% of the thickness t1, the coating layer may be softened upon heating (for example, heating at 60° C. or greater to not more than 140° C.) and disappear satisfactory, provided that the coating layer is formed in proper composition.

The mechanism through which the coating layer disappears is as follows. The coating layer softens by applying heat which exceeds the glass transition temperature of the coating layer forming resin. Through this, the resin of the coating layer is mixed with the thermosetting resin (prior to curing) that forms the adhesive layer, and integrated with the adhesive layer (incorporated into the adhesive layer). As a result, the coating layer that was present on the adhesive layer apparently disappears.

When the coating layer is too thick, it may not be completely incorporated into the adhesive layer, so that there is a possibility that disappearance of the coating layer will not proceed well. When a thermal foaming agent is contained, in some cases the thermal foaming agent in the adhesive layer may not foam well, resulting that the foaming property may be possibly impaired.

Note that, as described above, in the invention, when at least a part of the adhesive layer after heating curing is exposed (contacted) to part of the adhesive sheet, whose adhesive layer was cured by heating, in contact with an adherend, it is considered to "the coating layer is disappearing."

In one embodiment of the invention, it is preferable that t2 is, for example, at least 0.5 μm and not more than 600 μm.

It is preferable that the coating layer forming resin is determined, such that the glass transition temperature (T3)

thereof is at least 60° C. and not more than 140° C. When the glass transition temperature (T3) of the coating layer is too low, stickiness (tackiness) of the coating layer surface may increase, and thus there is a possibility that the effect of the present invention may become hard to obtain. While T3 is too high, the coating layer may not soften well within the temperature range of heating curing of the adhesive layer, and thus there is a concern that the adhesive force derived from the adhesive layer may not be exerted well.

In one embodiment of the invention, it is preferable that the coating layer forming resin is determined in relation to the composition of the adhesive layer. Considering the affinity between the coating layer and the adhesive layer may possibly make it easier for the coating layer to be incorporated (permeated) into the adhesive layer, when it softens. It will allow one to design thickness of the coating layer easily. For example, when a product named NC2000L (novolac epoxy resin, from Nippon Kayaku Co., Ltd., with an epoxy equivalent of 229 to 244, softening temperature of 47 to 57° C.) is used for an epoxy resin, which has a weight average molecular weight of less than 800, to be contained in the adhesive layer forming adhesive composition (contact angle of 86.4 degrees), it is preferable to use a bisphenol A type product named PKHH (contact angle of 83.3 degrees) for a coating layer forming resin.

As described above, an adhesive sheet according to one embodiment of the invention may be prepared by sequentially forming an adhesive layer and a coating layer on a substrate. Alternatively, as described above, it may be prepared by sequentially forming a coating layer and an adhesive layer on a separately prepared release film, followed by affixing (laminating) it to a substrate. Alternatively, the adhesive sheet may be prepared by affixing (laminating) the release film on which a coating layer is provided and the substrate on which an adhesive layer is provided.

The adhesive sheet of the invention as described above may be widely used in the electrical or electronics industries, for example, in application such as a void filler for gaps which are formed between a housing (window part) and an image display member fixed to an image display device (liquid crystal display, electroluminescent display, plasma display, and the like) or an optical member (camera, lens, or the like) fixed to a portable electronic device (cell phone, portable information terminal, and the like), as well as in applications in which the adhesive sheet is interposed in a gap between adjacent coils of different phases in a coil end part of a stator used in a motor or generator, or a gap within a slot groove of a stator core, and the like.

The adhesive sheet of the invention is particularly suited for an application in which the adhesive sheet is interposed between adjacent coils of different phases, in order to secure insulation between phases, at places where different coils intersect their winding fluxes in a coil end part where a coil is projected from both of the end parts of a stator core in a motor or generator (JP 2010-103162 A, JP 2012-170248 A).

The stator used in a motor or generator is composed of a stator core and a coil made by bundled winding wire, which is prepared from a thin copper wire covered with insulating film made from resin composition. The stator core is typically formed in the shape of a cylinder, and multiple slot grooves extending along the lengthwise direction are provided at an inner peripheral side, and the coil is attached to the stator core by being respectively housed in separate slot grooves. Sufficient insulation should be secured for this type of coils, thus an insulating sheet is inserted in a gap within the slot grooves of the stator core and solidified with a liquid (paste) resin composition seal material (for example, the material disclosed by JP 2003-33785 A) such that those inserted insulating sheets do not fall off, and the coil, insulating sheets and resin composition are integrated to use.

However, when an attempt is made to use this type of seal material in order to integrate the coil with insulating sheets to fill in the gaps in the slot grooves of the stator core, the seal material needs to be poured through the outer layer of the stator core, requiring the seal material in an amount more than originally required amount, resulting in the increased loss in the amount of seal material. Moreover, when seal material is used, adhesion to the positions other than where required may easily occur, and therefore complex operations may be required to prevent this. Furthermore, recently there is a demand for improvement of the space factor of a conductor coil for the slot, along with a demand for more compact, thinner electrical and electronic devices. Accordingly, the gap between the inner wall of the slot and the conductor coil has become narrower, for example, 1 mm or less, which makes it difficult to use a seal material in order to fill such a narrow gap since adjusting a viscosity of a seal material is not easy.

The adhesive sheet of the invention is particularly advantageous for filling the narrow gaps of 1 mm or less, in particular for the alternative use in the above-described solidification applications in which insulating sheets and seal material are used separately.

EXAMPLES

The present invention will be illustrated in detail by way of the Examples (including Examples and Comparative Examples) below, but the present invention shall be not limited to those specific Examples. Note that unless otherwise specified in Examples, "%" and "parts" refers to mass % and parts by mass, respectively.

Examples 1-23 and Comparative Examples 1-3

1. Preparation of the Adhesive Layer Forming Coating Solution

The following constituent components were homogeneously mixed at a solid content ratio (mass based) shown in Table 1 to prepare adhesive layer forming coating solution (a to k). The total solid content in each coating solution was 30 mass % to 50 mass %. The particularities of the thermosetting resins (A1 to A11) contained in each coating solution are shown in Table 2. Note that the compositions of Examples 1 and 2, and Comparative Examples 1-3 shown in Table 5 are compositions that do not contain thermally expandable microspheres, i.e. a thermal foaming agent, in the adhesive layer forming coating solution, and the compositions of all of the other examples are compositions that contain a thermal foaming agent.

<<Constituent Components of Adhesive Layer Forming Coating Solution a to k>>

Thermosetting resin (epoxy resin): Types described in Table 2 and parts by mass described in Table 1

Curing agent (solid content of 100%): Parts by mass described in Table 1 (dicyandiamide (DICY), from Japan Epoxy Resins Co., Ltd.)

Curing accelerator (solid content of 100%): Parts by mass described in Table 1 (Curezol 2MZ-A, 2,4-diamine-6-[2'-methylimidazolyl-(1')]-ethyl-s-triazine, from Shikoku Chemicals Corp.)

Thermally expandable microspheres (thermal foaming agent): Parts by mass described in Table 1 (Matsumoto Microspheres, F100M, thermally expandable microspheres, mass average particle diameter: 17 to 23 μm, thermal expansion temperature (same as the thermal foaming temperature T1): 120° C., maximum thermal expansion temperature: 160° C., expansion ratio: 10 times, from Matsumoto Yushi-Seiyaku Co., Ltd.)

TABLE 1

| Adhesive Layer Forming Coating Solution | Adhesive Composition (Solid Content Ratio) | | | | | | | | | | | Curing Agent | Curing Accelerator | Thermally Expandable Microspheres[*1)] | Curing Starting Temperature (T2) °C. |
|---|---|---|---|---|---|---|---|---|---|---|---|---|---|---|---|
| | Thermosetting Resin | | | | | | | | | | | | | | |
| | A1 | A2 | A3 | A4 | A5 | A6 | A7 | A8 | A9 | A10 | A11 | | | | |
| a | 100 | — | — | — | — | — | — | — | — | — | — | 11.1 | 0.5 | 10 | 148 |
| b | — | 100 | — | — | — | — | — | — | — | — | — | 8.4 | 0.5 | 10 | 150 |
| c | — | — | 100 | — | — | — | — | — | — | — | — | 8.9 | 0.5 | 10 | 151 |
| d | — | — | — | 100 | — | — | — | — | — | — | — | 4.4 | 0.5 | 10 | 152 |
| e | — | — | — | — | 100 | — | — | — | — | — | — | 10.0 | 0.5 | 10 | 155 |
| f | — | — | — | — | — | 100 | — | — | — | — | — | 11.1 | 0.5 | 10 | 155 |
| g | — | — | — | — | — | — | 100 | — | — | — | — | 3.2 | 0.5 | 10 | 158 |
| h | — | — | — | — | — | — | — | 100 | — | — | — | 11.1 | 0.5 | 10 | 155 |
| i | — | — | — | — | — | — | — | — | 100 | — | — | 11.1 | 0.5 | 10 | 155 |
| j | — | — | — | — | — | — | — | — | — | 100 | — | 2.3 | 0.5 | 10 | 158 |
| k | — | — | — | — | — | — | — | — | — | — | 100 | 2.1 | 0.5 | 10 | 159 |

[*1)]Not added to Example 1 and Comparative Examples 1 to 3.

TABLE 2

| | Type | Product Name | Epoxy Equivalent (g/eq) | Softening Temperature (°C.) | Weight Average Molecule Weight | Viscosity (190° C.) (dPa·s) |
|---|---|---|---|---|---|---|
| A1 | Bis A liquid | jER 828 (Mitsubishi Chemical) | 184~194 | liquid at room temperature | 370 | — |
| A2 | Bis A solid | jER 834 (Mitsubishi Chemical) | 230~270 | Semi-solid at room temperature | 470 | 0.05 |
| A3 | Novolac | NC-2000L (Nippon Kayaku) | 229~244 | 47~57 | 700~800 | 0.11 |
| A4 | Bis A solid | jER 1001 (Mitsubishi Chemical) | 450~500 | 64 | 900 | 0.34 |
| A5 | Novolac | jER 157S70 (Mitsubishi Chemical) | 200~220 | 70 | 900~1,000 | 0.28 |
| A6 | Phenol novolac | N-775 (DIC) | 184~194 | 75 | 1,100 | 0.78 |
| A7 | Bis A solid | jER 1002 (Mitsubishi Chemical) | 600~700 | 78 | 1,200 | 0.59 |
| A8 | Cresol novolac | N-680 (DIC) | 184~194 | 85 | — | — |
| A9 | Cresol novolac | N-695 (DIC) | 184~194 | 95 | — | — |
| A11 | Bis A solid | jER 1004 (Mitsubishi Chemical) | 875~975 | 97 | 1,650 | 1.92 |
| A12 | Bis A solid | jER 1006FS (Mitsubishi Chemical) | 900~1,100 | 112 | — | 5.85 |

2. Preparation of the Coating Layer Forming Coating Solution

The following constituent components were homogeneously mixed at the solid content ratios (mass based) shown in Table 3 to prepare coating layer forming coating solutions (A to G). The total solid content in each coating solution was 30 mass % to 50 mass %. The particularities of the thermoplastic resins (B1 to B7) contained in each coating solution are shown in Table 4.

<<Constituent Components of the Coating Layer Forming Coating Solutions A to G>>

Thermoplastic resin: Types described in Table 4 and parts by mass described in Table 3

Curing agent (solid content of 75%): Parts by mass described in Table 3 (Takenate 600, from Mitsui Takeda Chemicals, Inc., NCO content: 43.3%)

TABLE 3

| Coating Layer Forming Coating Solution | Coating Agent Composition (Solid Content Ratio) | | | | | | | Curing Agent |
|---|---|---|---|---|---|---|---|---|
| | Thermoplastic Resin | | | | | | | |
| | B1 | B2 | B3 | B4 | B5 | B6 | B7 | |
| A | 100 | — | — | — | — | — | — | 10 |
| B | — | 100 | — | — | — | — | — | 10 |

TABLE 3-continued

| Coating Layer Forming Coating Solution | Coating Agent Composition (Solid Content Ratio) | | | | | | | Curing Agent |
|---|---|---|---|---|---|---|---|---|
| | Thermoplastic Resin | | | | | | | |
| | B1 | B2 | B3 | B4 | B5 | B6 | B7 | |
| C | — | — | 100 | — | — | — | — | 10 |
| D | — | — | — | 100 | — | — | — | 10 |
| E | — | — | — | — | 100 | — | — | 10 |
| F | — | — | — | — | — | 100 | — | 10 |
| G | — | — | — | — | — | — | 100 | 10 |

TABLE 41

| | Category | Type | Product Name | Glass Transition Temperature (T3) (° C.) |
|---|---|---|---|---|
| B1 | Polyester resin | — | Vylon 200 (Toyobo) | 67 |
| B2 | Phenoxy resin | Bisphenol A | PKHH (InChem) | 92 |
| B3 | Phenoxy resin | flexible backbone | YL7174 (Mitsubishi Chemical) | 15 |
| B4 | Phenoxy resin | rigid backbone A | YX6954 (Mitsubishi Chemical) | 130 |
| B5 | Phenoxy resin | rigid backbone B | YX8100 (Mitsubishi Chemicals) | 150 |
| B6 | Ethylene-vinyl acetate copolymer | — | EV250 (DuPont-Mitsui Polychemicals) | −23 |
| B7 | Polyvinyl butyral | — | BM-S (Sekisui Chemical) | 60 |

3. Preparation of the Adhesive Sheet

Using the coating layer forming coating solutions and the adhesive layer forming coating solutions shown in Tables 5 to 8, a prescribed coating layer forming coating solution was coated onto a treated release surface of a release film (thickness of 38 μm, Byna No. 23: from Fujimori Kogyo Co., Ltd.) using a Baker-type applicator. A coating layer with a prescribed thickness (5 μm for Examples 1 to 17 and Comparative Examples 1 to 3, and the values shown in the "Coating Layer Film Thickness" section of Table 8 for Examples 18 to 23) was then formed by drying for 1 minute at 140° C. Next, a prescribed adhesive layer forming coating solution was applied onto the coating layer surface in the same manner as described above. Then the adhesive layer with a prescribed thickness (50 μm for Examples 1 to 17 and Comparative Examples 1 to 3, and the values shown in the "Pre-Heating Film Thickness" section of Table 8 for Examples 18 to 23) was formed by drying at 120° C. for 1 to 2 minutes. After the adhesive layer surface and a substrate (thickness of 25 μm, polyimide film: Kapton 100H, from DuPont-Toray Co., Ltd.) were laminated while applying heat of 80° C., the release film was peeled off to obtain the adhesive sheets of Examples 1 to 23 and Comparative Examples 1 to 3.

4. Evaluation

The adhesive sheets obtained from the examples and comparative examples were measured or evaluated the following items using the following methods. The results are shown collectively in Tables 5 to 8.

[Thermal Foaming Temperature (T1)]

A dynamic viscoelasticity measuring device (model DMA Q800, from TA Instruments) was used for a measuring device, and 0.5 mg of thermally expandable microspheres were placed into an aluminum cup having a diameter of 6.0 mm (inner diameter of 5.65 mm) and a depth of 4.8 mm, and then an aluminum lid (5.6 mm, thickness of 0.1 mm) was placed at the top of a thermally expandable microspheres layer to prepare the sample. The sample height was measured by applying 0.01 N of force from above the sample using a pressure applicator. The sample was heated from 20° C. to 300° C. at a temperature increase rate of 10° C./min in a pressurized state with 0.01 N force, and the amount of displacement in the vertical direction of the pressure applicator was measured. The temperature at which displacement started in the positive direction was used as the thermal foaming temperature (T1).

[Curing Starting Temperature (T2) of the Adhesive Layer]

A differential scanning calorimeter (DSC3200, from Mac Science) was used as the measuring device. The sheet-shaped adhesive layer resin prepared above was heated from room temperature to 300° C. at a rate of 10° C./min, and the cross point of a DSC baseline in a normal range and a DSC rising line during the curing reaction was used as a curing starting temperature (T2).

[Glass Transition Temperature (T3)] of the Coating Layer

The differential scanning calorimeter (DSC3200, from Mac Science) was used as the measuring device. The sheet-shaped coating layer resin prepared above was heated from room temperature to 300° C. at a rate of 10° C./min, and the DSC baseline change point was used as a glass transition point (T3).

[Film Thickness (t2) of the Coating Layer]

The total thickness of the release film and coating layer of laminate 2 prior to the formation of the adhesive layer (laminated article of the release film and coating layer) was measured for the adhesive sheets obtained from examples and comparative examples using a micrometer, and the film thickness (t2) of the coating layer was calculated by subtracting the thickness of the release film from the measurements. Note that as for the thickness of the release film, a measurement measured using a micrometer was used.

[Film Thickness (t1) (Prior to Heating) of the Adhesive Layer]

The total thickness of the release film, coating layer and adhesive layer of laminate 1 prior to the lamination of a substrate (laminated article of the release film, coating layer and adhesive layer) was measured for the adhesive sheets obtained from examples and comparative examples using a micrometer, and the film thickness (t1) of the adhesive layer was calculated by subtracting the thickness of the laminate 2 prior to the formation of the adhesive layer (laminated article of the release film and coating layer) from the measurements.

[Film Thickness of the Adhesive Layer (After Heating)]

For the adhesive sheets from examples and comparative examples, laminate 1 prior to the lamination of a substrate (polyimide film) (laminated article of the release film, coating layer and adhesive layer) was cut into a size of 5 cm×5 cm, placed on a 1 mm thick SPCC steel plate such that the adhesive layer was contacted with the plate, and the release film was removed from the laminate 1. After placed in an oven heated to 190° C. for 30 minutes, it was taken out from the oven. Then the total thickness of the SPCC steel plate and adhesive layer (and coating layer) was measured, and the film thickness after heating of the adhesive layer was calculated by subtracting the thickness of the release film from the measurements.

[Cracking of the Adhesive Layer (Cracks 1, 2)]

For the samples from the examples and comparative examples, an arbitrary point on the side of adhesive layer was bent 180 degrees before heating and foaming either without coating layer or with a coating layer, and the conditions of each adhesive layer were visually observed. As a result, the samples for which any cracking of the adhesive layer itself (including the falling off of the adhesive layer from the substrate, the same shall apply hereinafter) was not observed were considered to be good and were marked "○", and the samples for which cracking was observed or which could not be bent 180 degrees were considered to be poor and were marked "x". The absence of a coating layer was indicated by "crack 1", and the presence of a coating layer was indicated by "crack 2".

[Tackiness of the Adhesive Layer (Tackiness 1, 2)]

The adhesive sheets before heating, or heating and foaming from each examples and comparative examples were cut into a size of 5 cm×5 cm, and six sheets were stacked such that the coating layers were opposed to each other, and then sandwiched between 1 mm thick glass plates. A 100 g load was applied on the top thereof, and then left for 24 hours in a room temperature (25° C.) and in a 30° C. environment, respectively, then the load was removed, and the samples were left for 30 minutes or longer at room temperature. After which the distance between glass plates were increased in vertical direction and the peeling condition was confirmed, and the adherence between the coating layers was evaluated. Note that when a coating layer was not present, the sheets were stacked such that the adhesive layers were opposed to each other, and the adherence between the adhesive layers was evaluated according the same method.

Here, the state in which there existed delamination between an adhesive layer and a substrate of the adhesive sheet while the coating layers of respective adhesive sheets were adhered each other was considered that an adhesion existed, in other words, that the coating layer exhibited tackiness at room temperature. In contrast, when the distance between glass plates were increased in vertical direction and there observed the peeling occurred between the coating layers in contact with each other, it was considered that adherence did not exist, in other words, that the coating layer did not exhibit tackiness. The samples for which adherence was not observed in both environments were evaluated as "○", the samples that exhibited adherence only in the 30° C. environment were evaluated as "Δ", and the samples that exhibited adherence in both environments were evaluated as "x". Note that the absence of a coating layer was indicated by "tackiness 1", and the presence of a coating layer was indicated by "tackiness 2".

[Disappearance of the Coating Layer]

For the adhesive sheets from examples and comparative examples, the laminate 1 prior to the lamination of a substrate (laminated article of the release film, coating layer and adhesive layer) was placed on a 1 mm thick SPCC steel plate such that the adhesive layer was contacted with the plate, and the release film was removed. Further 1 mm thick SPCC steel plate was stacked and fixed so as to form a gap that was twice the size of the total thickness of the adhesive layer and the thickness of the coating layer. After placed in an oven heated to 190° C. for 30 minutes, it was taken out from the oven. This was then cut vertically such that top of the SPCC steel plate and a cross section of the adhesive layer (and coating layer) can be observed, and the cross-section was observed using a microscope to determine the presence or absence of the coating layer. As a result, the samples for which the coating layer had disappeared and which had affixed to the SPCC steel plate were evaluated as "⊚", the samples for which the coating layer partially remained but which had affixed to the SPCC steel plate were evaluated as "○", and the samples for which the coating layer remained and which were not affixed to the SPCC steel plate were evaluated as "x".

[Foaming Scale Factor and Foaming Property of the Adhesive Sheets]

The foaming scale factor of the adhesive sheets obtained from examples and comparative examples was calculated by dividing the above "film thickness (after heating) of the adhesive layer" by the sum of the "film thickness (t2) of the coating layer" and the "film thickness (t1) (prior to heating) of the adhesive layer". As a result, samples with a foaming scale factor of 3 times or greater were considered as good and were indicated by "⊚", samples with a foaming scale factor of at least 2 times but less than 3 times were considered as good and were indicated by "○", and the samples for which foaming was not possible due to the increase in viscosity were considered as poor and were indicated by "x".

[Measuring the Adhesive Strength of the Adhesive Sheet]

For the adhesive sheets from examples and comparative examples, laminate 1 prior to the lamination of a substrate (laminated article of the release film, coating layer, and adhesive layer) prior to lamination of the substrate were placed on a 1 mm thick SPCC steel plate (steel plate A) such that the adhesive layer was contacted with the plate, and the release film was removed. Further 1 mm thick SPCC steel plate (steel plate B) was stacked on the side of the coating layer and fixed (laminated article of the steel plate A, adhesive layer, coating layer and steel plate B). Next, this laminated article was placed in an oven heated to 190° C. for 30 minutes, and then it was taken out from the oven. The UTM-5T Tensilon Universal Testing Machine (from A&D Co., Ltd.) was used to measure the shear bond strength (units: MPa) by pulling the steel plate A and the steel plate B of the laminated article after heating in a direction parallel to the adhesion surface and opposite each other (a shearing direction).

Note that, as described above, the disappearance of the coating layer was determined by observing a cross-section of the adhesive sheet using a microscope, but, depending on the sample, determining the disappearance of the coating layer using the above method was difficult when both the adhesive layer and the coating layer were transparent. In such a case, disappearance of the coating layer may be determined according to the following method. When the coating layer disappears, and the adhesive layer adheres to the steel plate A and the steel plate B, the shear bond strength increases comparing when only the coating layer is adhered to the steel plates. Therefore, a laminated article provided with a coating layer on the release film is provided between the steel plate A and the steel plate B in the same manner as above, and the shear bond strength (Pc) of the coating layer alone is measured.

Note that the Pc values for the coating layers made from the coating layer forming coating solutions A, B, C, D, E, F and G shown in Table 3 were respectively 11 MPa, 16 MPa, 16 MPa, 15 MPa, 13 MPa, 7 MPa and 8 MPa.

Furthermore, based on a ratio (Pm/Pc) of the shear bond strength measurement value (Pm) for the steel plate A and the steel plate B of the laminated article after heating to the shear bond strength (Pc) of the coating layer alone, the disappearance of the coating layer was evaluated. Here, the samples for which the (Pm/Pc) value was more than 110% were indicated by "⊚", the samples with more than 100% but at or below 110% were indicated by "○", and the samples with 100% or less were indicated by "x". Note that the samples for which the shape of the adhesive layer was not maintained and measurement was not possible were indicated by "-".

TABLE 5

| | Adhesive Layer | | | | | | | Evaluation | | | | | |
| --- | --- | --- | --- | --- | --- | --- | --- | --- | --- | --- | --- | --- | --- |
| | Type of Coating Solution | | Film Thickness | | Curing | Coating Layer | | Adhesive Layer Alone | | Including Coating Layer | | Disappearance of the | |
| | Adhesive Layer Forming | Coating Layer Forming | (μm) t1 (Before Heating) | Softening Temperature | Starting Temperature (T2) | Glass Transition Temperature (T3) (° C.) | Film Thickness t2 (μm) | Crack 1 | Tack 1 | Crack 2 | Tack 2 | Coating Layer | Pm (Mpa) |
| Comparative Example 1 | c | F | 50 | 47-57 | 151 | -23 | 5 | ○ | X | ○ | X | ◎ | 19 |
| Comparative Example 2 | c | C | 50 | 47-57 | ↑ | 15 | 5 | ○ | X | ○ | X | ◎ | 19 |
| Example 1 | c | B | 50 | 47-57 | ↑ | 92 | 5 | ○ | X | ○ | ○ | ◎ | 19 |
| Example 2 | c | A | 50 | 47-57 | ↑ | 67 | 5 | ○ | X | ○ | ○ | ◎ | 19 |
| Comparative Example 3 | k | B | 50 | 112 | 159 | 92 | 5 | X | ○ | ○ | ○ | X | 16 |

As shown in Table 5, Comparative Examples 1 and 2 and Examples 1 and 2, which used novolac with a softening temperature of 47° C. to 57° C. in the adhesive layer, exhibited tackiness by the adhesive layer alone. In Comparative Examples 1 and 2, in which a phenoxy resin with a glass transition temperature of 92° C. and a polyester resin with a glass transition temperature of 67° C. was used as a coating layer respectively, the coating layer exhibited tackiness at room temperature, and tackiness of the adhesive sheet in which the coating layer was laminated on the contact layer, could not be prevented. In contrast, in Examples 1 and 2, in which an ethylene-vinyl acetate copolymer with a glass transition temperature of -23° C. and a phenoxy resin with a glass transition temperature of 15° C. was used as the coating layer respectively, the coating layer did not exhibit tackiness at room temperature, demonstrating that the tackiness was suppressed in the adhesive sheet in which the coating layer was laminated on the contact layer, providing an improved workability.

Further, in Comparative Example 3, in which a solid bisphenol A type epoxy resin with a softening temperature of 112° C. was used as the adhesive layer, the adhesive layer alone did not exhibit tackiness at room temperature, but cracking occurred. In an adhesive sheet for which a phenoxy resin with a glass transition temperature of 92° C. was laminated on this adhesive layer as a coating layer, no tackiness was observed and the occurrence of cracking was suppressed, but disappearance of the coating layer after heating was not observed, demonstrating that the adhesive strength was low.

From the those results, an advantageous effect from the configuration of the present invention was confirmed, which is, the coating layer does not exhibit tackiness at room temperature, and at least a part of the coating layer disappears in the region ranging from an interface between the adhesive layer and the coating layer to a surface of the coating layer by heating the adhesive sheet at a temperature not lower than the curing starting temperature of the adhesive layer.

TABLE 6

| | Adhesive Layer | | | | | | | | |
| --- | --- | --- | --- | --- | --- | --- | --- | --- | --- |
| | Type of Costing Solution | | Film Thickness (μm) | | | | | Coating Layer | |
| | Adhesive Layer Forming | Coating Layer Forming | t1 (Before Heating) | After Heating | Thermal Foaming Temp. | Softening Temp. | Curing Starting Temp. (T2) | Glass Transition Temp. (T3) (° C.) | Film Thickness t2 (μm) |
| Example 3 | c | G | 50 | >300 | 120 | 47-57 | 151 | 60 | 5 |
| Example 4 | c | B | 50 | >300 | ↑ | 47-57 | ↑ | 67 | 5 |
| Example 5 | c | A | 50 | >300 | ↑ | 47-57 | ↑ | 92 | 5 |
| Example 6 | c | D | 50 | 227 | ↑ | 47-57 | ↑ | 130 | 5 |
| Example 7 | c | E | 50 | 245 | ↑ | 47-57 | ↑ | 150 | 5 |

TABLE 6-continued

|  | | Foaming | Evaluation | | | | | |
|---|---|---|---|---|---|---|---|---|
|  | | | Scale Factor | Adhesive Layer Alone | | Including Coating Layer | | Foaming | Disappearance of the Coating |
|  | t2/t1 | (times) | Crack 1 | Tack 1 | Crack 2 | Tack 2 | Performance | Layer |
| Example 3 | 0.1 | >5.5 | ○ | X | ○ | ○ | ◎ | ◎ |
| Example 4 | 0.1 | >5.5 | ○ | X | ○ | ○ | ◎ | ◎ |
| Example 5 | 0.1 | >5.5 | ○ | X | ○ | ○ | ◎ | ◎ |
| Example 6 | 0.1 | 4.1 | ○ | X | ○ | ○ | ◎ | ◎ |
| Example 7 | 0.1 | 4.5 | ○ | X | ○ | ○ | ◎ | ○ |

In Examples 3 to 7, novolac epoxy resins having a softening temperature of from 47 to 57° C. were used in each example as an adhesive layer, on which different kinds of coating layers were laminated to form an adhesive sheets. The adhesive layer alone exhibited tackiness, but the adhesive layers of Examples 3 to 7, in which the coating layer that did not exhibit tackiness at room temperature and has a glass transition temperature of from 60° C. to 150° C. was used, suppressed tackiness. Also, an excellent foaming characteristic was obtained in each Examples 3 to 7.

While the coating layer completely disappeared in Examples 3 to 6 in which a glass transition temperature of the coating layer was from 60° C. to 130° C., only a partial disappearance of the coating layer was observed in Example 7, in which a glass transition temperature of the coating layer was 150° C., and it was also observed decreasing adhesive strength.

From those results, it may be preferable that the glass transition temperature of the coating layer is at least 60° C. to not more than 140° C.

example has at least one "x"). Nevertheless, in the case of the "Including Coating Layer", in which a coating layer was added, Tackiness 2 was improved. From this result, examples which were excellent in all of Crack 2, Tackiness 2 and the foaming property were obtained (Examples 4, 5, and 9 to 15).

Note that it is not described in the tables, but it was found that when the adhesive layer-forming coating solution a, in which A1 was used as thermosetting resin in the adhesive composition, an excellent properties, such as foaming property, was hard to obtain. Based on those results, it was suggested that a semi-solid or solid resin was preferable to be used as the thermosetting resin to be added to the adhesive composition.

From the results in Examples 4, 5, and 8 it was found that even if "Adhesive Layer Alone" itself was sticky, it shall be covered with the existing coating layer, and thus it could play an important role in preventing a decrease in workability even without a separator (Tackiness 2 was marked "○"). Further, it was determined from the results in Examples 9 to 15 that even when cracking occurred within the "Adhesive Layer Alone", the cracked film was held in place because of the existing coating layer, and thus the coating layer disappeared by heating (incorporated into the adhesive layer) and

TABLE 7

|  | Type of Coating Solution | | Adhesive Layer Film | | Coating Layer | | Foaming | Evaluation | | | | | |
|---|---|---|---|---|---|---|---|---|---|---|---|---|---|
|  | | | | | | | | Adhesive Layer Alone | | Including Coating Layer | | | |
|  | Adhesive Layer Forming | Coating Layer Forming | Thickness (μm) | | Film | | Scale | | | | | Foaming | Disappearance of the Coating |
|  | | | t1 (Before Heating) | After Heating | Thickness t2 (μm) | t2/t1 | Factor (times) | Crack 1 | Tack 1 | Crack 2 | Tack 2 | Performance | Layer |
| Example 8 | b | B | 50 | 165 | 5 | 0.1 | 3.0 | ○ | X | ○ | ○ | ◎ | ◎ |
| Example 4 | c | B | 50 | >300 | 5 | 0.1 | >5.5 | ○ | X | ○ | ○ | ◎ | ◎ |
| Example 5 | c | A | 50 | >300 | 5 | 0.1 | >5.5 | ○ | X | ○ | ○ | ◎ | ◎ |
| Example 9 | d | B | 50 | >300 | 5 | 0.1 | >5.5 | X | Δ | ○ | ○ | ◎ | ◎ |
| Example 10 | e | B | 50 | >300 | 5 | 0.1 | >5.5 | X | Δ | ○ | ○ | ◎ | ◎ |
| Example 11 | f | B | 50 | >300 | 5 | 0.1 | >5.5 | X | Δ | ○ | ○ | ◎ | ◎ |
| Example 12 | g | B | 50 | 180 | 5 | 0.1 | 3.3 | X | ○ | ○ | ○ | ◎ | ◎ |
| Example 13 | h | B | 50 | 215 | 5 | 0.1 | 3.9 | X | ○ | ○ | ○ | ◎ | ◎ |
| Example 14 | i | B | 50 | 185 | 5 | 0.1 | 3.4 | X | ○ | ○ | ○ | ◎ | ◎ |
| Example 15 | j | B | 50 | 120 | 5 | 0.1 | 2.2 | X | ○ | ○ | ○ | ○ | ◎ |

As shown in Table 7, in the case of the "Adhesive Layer Alone", there were no examples which were excellent in all of Crack 1, Tackiness 1 and foaming property (every did not impair the working efficiency (Crack 2 was marked "○" and the Coating Layer Disappearance was marked "◎").

TABLE 8

| | Type of Coating Solution | | Adhesive Layer Film Thickness (μm) | | Coating Layer | | | Evaluation | | | |
|---|---|---|---|---|---|---|---|---|---|---|---|
| | Adhesive Layer Forming | Coating Layer Forming | t1 (Before Heating) | After Heating | Film Thickness t2 (μm) | t2/t1 | Foaming Scale Factor (times) | Including Coating Layer Crack 2 | Including Coating Layer Tack 2 | Foaming Performance | Disappearance of the Coating Layer |
| Example 4 | | | 50 | >300 | 5 | 0.1 | >6.0 | ○ | ○ | ◎ | ◎ |
| Example 18 | c | B | 35 | 225 | 20 | 0.6 | 6.4 | ○ | ○ | ◎ | ◎ |
| Example 19 | | | 50 | >300 | 25 | 0.5 | >6.0 | ○ | ○ | ◎ | ◎ |
| Example 20 | | | 30 | 145 | 25 | 0.8 | 4.8 | ○ | ○ | ◎ | ○ |
| Example 21 | | | 36 | >300 | 4 | 0.1 | >7.5 | ○ | ○ | ◎ | ◎ |
| Example 5 | c | A | 50 | >300 | 5 | 0.1 | >5.5 | ○ | ○ | ◎ | ◎ |
| Example 22 | | | 34 | >300 | 6 | 0.2 | >7.5 | ○ | ○ | ◎ | ◎ |
| Example 23 | | | 30 | 270 | 10 | 0.3 | 6.8 | ○ | ○ | ◎ | ◎ |

As shown in Table 8, the examples in which the film thickness t2 of the coating layer was 60% or less of the film thickness t1 of the adhesive layer (Examples 4, 18, 19, 21, 5, 22 and 23) exhibited excellent disappearance of the coating layer, compared to the ones in which the film thickness t2 of the coating layer was 83% of the film thickness t1 of the adhesive layer (Example 20). However, the evaluation of Example 20 shows that it shall be sufficient for practical use.

What is claimed is:

1. An adhesive sheet comprising:
   an adhesive layer consisting of an adhesive composition containing a thermosetting resin and a thermal foaming agent; and
   a coating layer comprising a resin and provided on the adhesive layer; characterized in that the coating layer does not exhibit tackiness at room temperature; the coating layer forming resin has a glass transition temperature (T3) thereof is at least 60° C. and not more than 92° C.; and at least a part of the coating layer disappears in a region ranging from an interface between the adhesive layer and the coating layer to a surface of the coating layer by heating the adhesive sheet at a temperature not lower than a curing starting temperature of the adhesive layer, wherein the following equation is satisfied:

$T3<T1$, wherein T1 is a thermal foaming temperature of the thermal foaming agent, and T3 is a glass transition temperature of the coating layer.

2. The adhesive sheet according to claim 1, characterized in that the thermosetting resin has a softening temperature of not higher than 105° C.

3. The adhesive sheet according to claim 1, characterized in that: an equation $T1 \leq T2$ is satisfied where T2 is a curing starting temperature of the adhesive layer.

4. The adhesive sheet according to claim 3, characterized in that T1 is 100° C. or higher to 200° C. or lower and T2 is 110° C. or higher to 250° C. or lower.

5. The adhesive sheet according to claim 1, characterized in that: an equation $t2 \leq 0.6 \times t1$ is satisfied where t1 is a thickness of the adhesive layer prior to heating, and t2 is a thickness of the coating layer.

6. The adhesive sheet according to claim 5, characterized in that t2 is 0.5 μm or more to 600 μm or less.

7. The adhesive sheet according to claim 5, characterized in that t1 is 20 μm or more to 1000 μm or less.

8. The adhesive sheet according to claim 1, characterized in that the thermosetting resin contained in the adhesive composition has a weight average molecular weight of 450 or more to 1650 or less.

9. The adhesive sheet according to claim 8, characterized in that the thermosetting resin is an epoxy resin.

10. The adhesive sheet according to claim 9, wherein the epoxy resin is a semi-solid or solid at room temperature.

11. The adhesive sheet according to claim 1, characterized in that the thermal foaming agent is thermally expandable microspheres.

12. The adhesive sheet according to claim 1, characterized in that the thermal foaming agent is contained in an amount of 1 part to 30 parts by mass relative to 100 parts by mass of the thermosetting resin contained in the adhesive composition.

13. The adhesive sheet according to claim 1, further comprising a substrate on which the adhesive layer is formed.

14. The adhesive sheet according to claim 1, characterized in that the adhesive sheet is used to fill a void.

15. An image display device, portable electronic device, or automobile component, comprising the adhesive sheet according to claim 1.

* * * * *